United States Patent
Rizzo

[11] 3,885,814
[45] May 27, 1975

[54] CENTRIFUGAL BICYCLE WHEEL
[76] Inventor: Robert Rizzo, 305 E. 28th St., Brooklyn, N.Y. 11226
[22] Filed: July 8, 1974
[21] Appl. No.: 486,637

[52] U.S. Cl.................. 280/217; 74/572; 301/41 W
[51] Int. Cl............................................. B62m 1/10
[58] Field of Search.......... 280/217, 212; 301/41 W; 74/572

[56] References Cited
UNITED STATES PATENTS
1,995,010   3/1935   Quinn............................ 280/217 X Primary Examiner—Leo Friaglia

[57] ABSTRACT

A wheel for the bicycle and the like which is specially weighted to afford enhanced momentum and stability. The additional weights are slidably attached to the spokes of the wheel and are spring biased whereby at certain speeds the weights are impelled to the rim by centrifugal force and at lesser speeds are retracted to the hub whereby inertia is reduced which is particularly important during acceleration at these speeds.

3 Claims, 3 Drawing Figures

PATENTED MAY 27 1975 3,885,814

CENTRIFUGAL BICYCLE WHEEL

The invention relates to vehicles and, in particular, to wheels therefor which are weighted as, for example, to attain improved balance.

Attachment of weights to vehicle wheels for balance and to their rim to afford greater forward momentum is known in the art. See, for example, U.S. Pat. No. 2,272,801. It has been found that such permanent placement of the weights as on the rim of bicycle wheels handicaps the rider in starting and in accelerating from relatively low speeds due to the inertia problem.

According to the invention a bicycle wheel is provided with radially movable weights which under spring tension are allowed to progress toward its rim at higher speeds and retract to the hub or axle while starting and at reduced speeds. To this end there is provided in sliding connection with the spokes of a bicycle wheel weights which are apertured to receive the spokes therethrough, the weights being connected on their ends nearest the wheel axle to one end of springs also mounted on the spokes which allow the weights to move centrifugally in the direction of the rim with increasing velocity but retract at lesser speeds. Desirably, but not essentially, the other end of the springs are connected to normally stationary yokes which are adjustable for the purpose of altering the minimum velocity of the cycle at which the weights are disposed at maximum distance from the wheel axle to achieve thereby its greatest momentum.

One object of the invention is to provide a selectively weighted wheel to impart thereto improved stability and momentum during travel.

Other objects and advantages of the invention may be appreciated on reading the following description of one embodiment thereof which is taken in conjunction with the accompanying drawings, in which.

Figure 1:
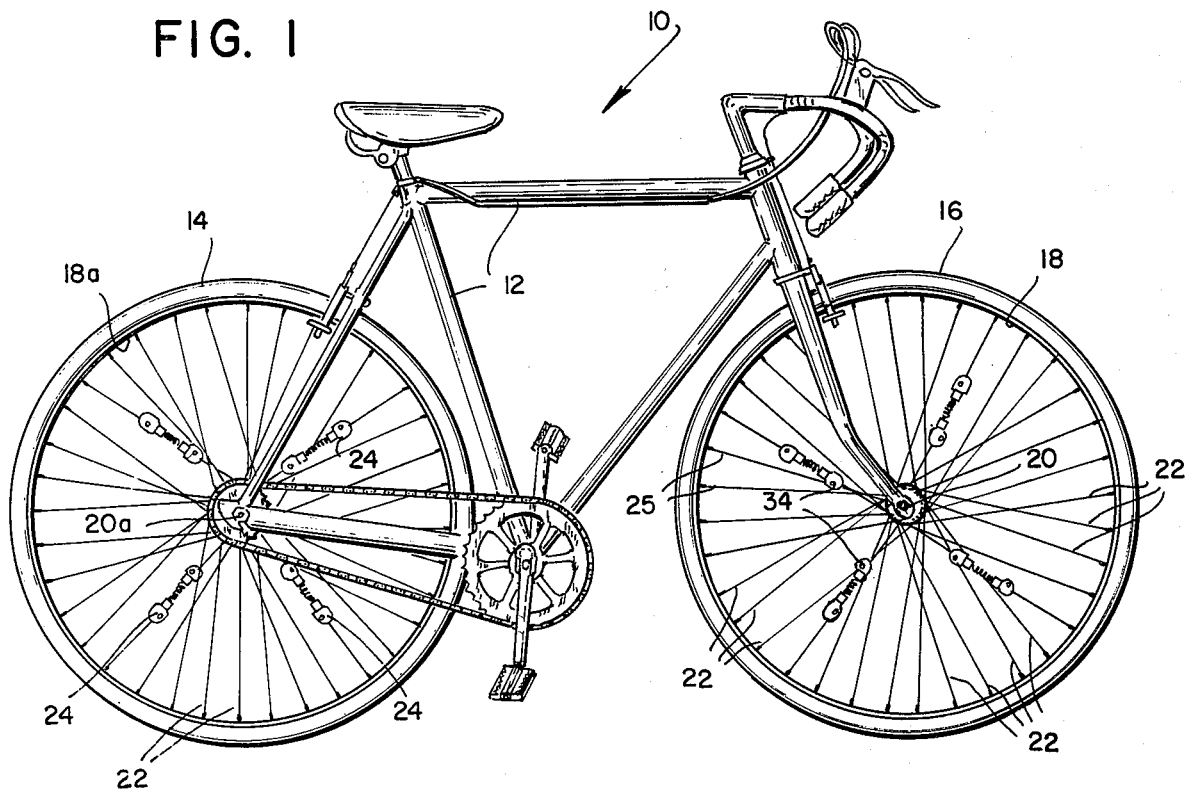
FIG. 1 is a view in elevation showing a bicycle, the wheels of which are weighted in accordance with the concept of the invention.
Figure 2:
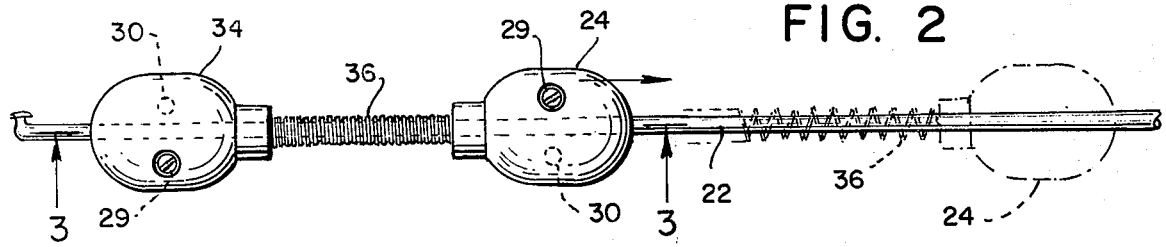
FIG. 2 is an enlarged view of a bicycle spoke provided with a slidable spring biased weight.
Figure 3:
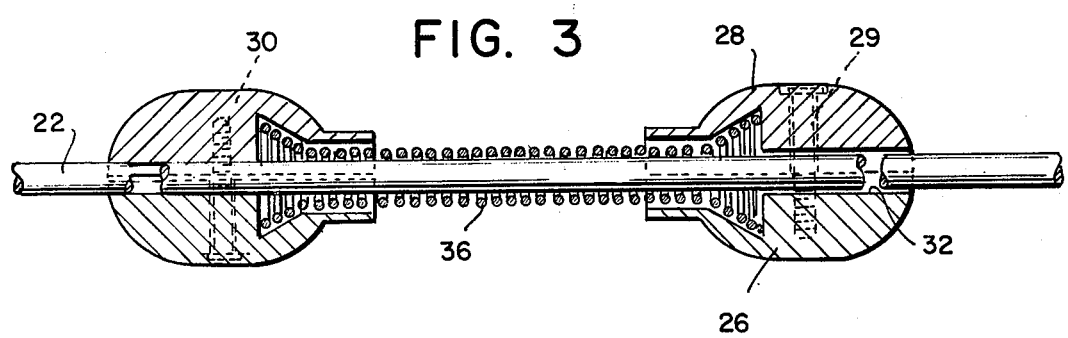
FIG. 3 is a section taken on the line 3—3 of FIG. 2.

Referring to the drawings, bicycle 10 comprises generally a frame 12, back wheel 14 and front wheel 16, the wheels having rims 18 and 18a and central axles 20 and 20a, respectively. Slidably mounted on the spokes 22 of the front wheel 16 are weights 24.

Each weight consists of two half shell members 26 and 28 which are longitudinally channelled. On assembly of the shells by means of set screws 29 and 30 the two channels form a bore 32 slightly larger in diameter than its spoke extending therethrough.

Also mounted on each spoke is a yoke 34 which, as shown, is identical in construction to the sliding weight except that its internal bore is slightly smaller in diameter than that of the weights so that on tightening the set screws it will remain stationary on the spokes.

Extending between the weights 24 and the yokes 34 are tension springs 36 which allow the weights to move radially and outwardly toward the rim at higher speeds and retract toward the hub at slower speeds such as normally prevail, for example, in going uphill. In riding the bicycle on an uphill grade, the retracted weights obviate the need for applying the additional torque to the wheel which would be required were the weights to stay proximate the wheel's rim. The yokes 34 are adjustable on the spokes 22 to assure that the weights are against the rim at higher speeds when the maximum momentum for maintaining speed and stability are desired.

Various modifications of the invention may be effected by persons skilled in the art without departing from the scope and principle thereof as defined in the appended claims.

What is claimed is:

1. A wheel having an outer rim and central axle, a plurality of spokes extending between said axle and rim, a slidable weight spring biased and mounted on at least one of said spokes, a stationary yoke mounted on said spokes on the axle side of said weight, a spring extending between said weight and said yoke, said yoke having means for adjusting the radial position thereof on said spoke.

2. A wheel as defined in claim 1 wherein a bore is formed in said weight to receive the spoke being of greater diameter than said spoke.

3. A wheel as defined in claim 1 wherein said yoke contains a bore receiving a spoke being of lesser diameter than that of said spoke.

* * * * *